(12) United States Patent
Dillinger

(10) Patent No.: US 10,239,433 B2
(45) Date of Patent: Mar. 26, 2019

(54) HEADREST AND METHOD FOR ASSEMBLING A HEADREST

(71) Applicant: Adient Luxembourg Holding S.à.r.l., Luxembourg (LU)

(72) Inventor: Thomas Dillinger, Ratingen (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/536,984

(22) PCT Filed: Dec. 16, 2015

(86) PCT No.: PCT/EP2015/080078
§ 371 (c)(1),
(2) Date: Jun. 16, 2017

(87) PCT Pub. No.: WO2016/097041
PCT Pub. Date: Jun. 23, 2016

(65) Prior Publication Data
US 2017/0349072 A1 Dec. 7, 2017

(30) Foreign Application Priority Data
Dec. 18, 2014 (DE) ........................ 10 2014 226 438

(51) Int. Cl.
*B60N 2/885* (2018.01)
*B60N 2/882* (2018.01)
*B60N 2/868* (2018.01)
*B60N 2/28* (2006.01)
*B60N 2/806* (2018.01)
*B60N 2/02* (2006.01)
*B60N 2/80* (2018.01)

(52) U.S. Cl.
CPC ........... *B60N 2/885* (2018.02); *B60N 2/2851* (2013.01); *B60N 2/2872* (2013.01); *B60N 2/806* (2018.02); *B60N 2/868* (2018.02); *B60N 2/882* (2018.02); *B60N 2002/022* (2013.01); *B60N 2002/899* (2018.02)

(58) Field of Classification Search
CPC ........ B60N 2/885; B60N 2/882; B60N 2/806; B60N 2/868; B60N 2/2872
USPC .................................................. 297/391, 398
See application file for complete search history.

(56) References Cited

U.S. PATENT DOCUMENTS 5,180,207 A  1/1993  Schmidt

FOREIGN PATENT DOCUMENTS

| CN | 1733525 A | 2/2006 |
|----|-----------|--------|
| DE | 101 96 653 T1 | 8/2003 |
| EP | 2 611 652 A1 | 7/2013 |
| EP | 2 626 238 A1 | 8/2013 |
| EP | 2 639 102 A1 | 9/2013 |
| WO | 95/09742 A1 | 4/1995 |
| WO | 2012/028284 A1 | 3/2012 |

*Primary Examiner* — Anthony D Barfield
(74) *Attorney, Agent, or Firm* — McGlew and Tuttle, P.C.

(57) ABSTRACT

A headrest (1) for a vehicle includes a main element (2) on which a wing element (3) is mounted by means of a hinge (4) so as to be rotatable about a substantially vertical axis. So as to create a frictional locking function, the hinge (4) includes a shaft (41) with a projection (43) as well as a bush (42) with a receptacle (44) that is associated with the projection (43). The shaft (41) is mounted in the bush (42), and in a locked position the projection (43) engages into the receptacle (44).

20 Claims, 2 Drawing Sheets

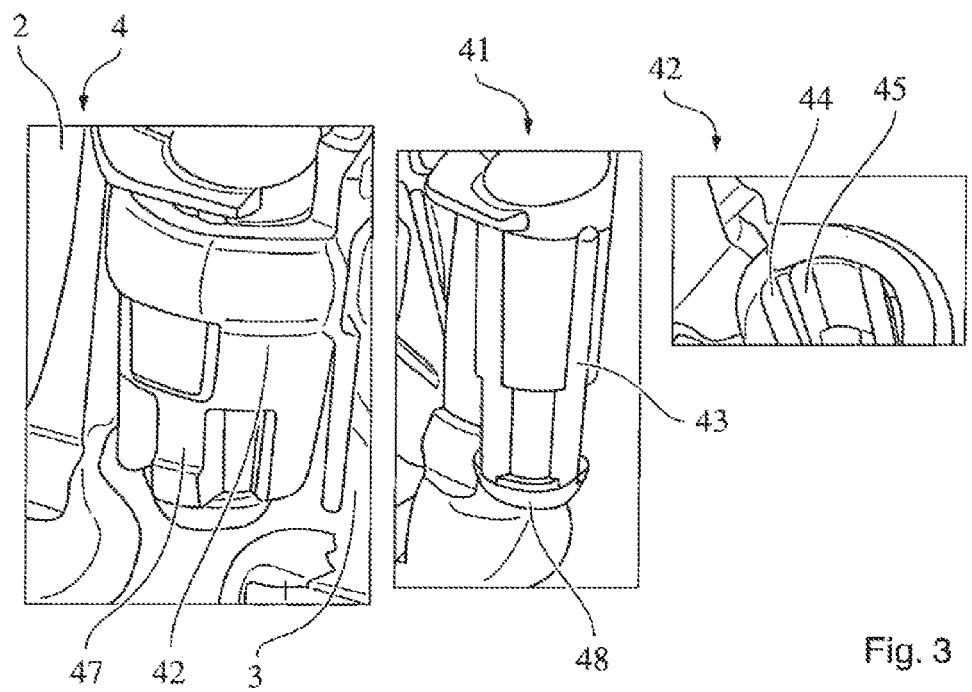
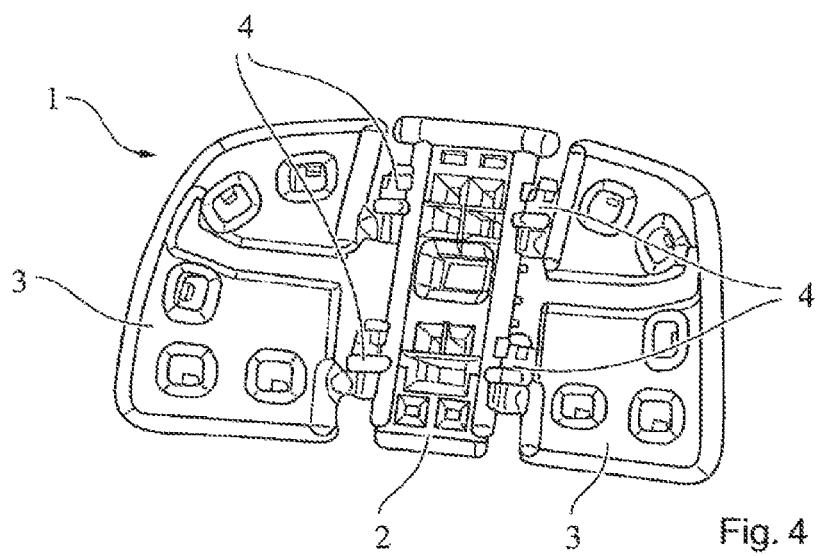
Fig. 3
Fig. 4

HEADREST AND METHOD FOR ASSEMBLING A HEADREST

CROSS REFERENCE TO RELATED APPLICATIONS

This application is a United States National Phase Application of International Application PCT/EP2015/080078, filed Dec. 16, 2015, and claims the benefit of priority under 35 U.S.C. § 119 of German Application 10 2014 226 438.3, filed Dec. 18, 2014, the entire contents of which are incorporated herein by reference.

FIELD OF THE INVENTION

The present invention relates to a headrest with a wing element and to a method for assembling a headrest with a wing element.

BACKGROUND OF THE INVENTION

Headrests with adjustable wing elements are known to a sufficient extent from the prior art. However, DE 10 196 653 and WO 95/09 742 disclose only headrests which are of comparatively complicated configuration and are therefore difficult to assemble. The headrest presented in EP 2 611 652 A1, in contrast, is comparatively straightforward to assemble and can be adjusted between two positions.

SUMMARY OF THE INVENTION

It is an object of the present invention to provide a headrest which has wing elements and is further improved in relation to those which are known from the prior art—in particular in respect of handling of the wing elements when the latter are being transferred between two adjustment positions.

The present invention achieves the object by way of a headrest with a basic element, on which a wing element is mounted by means of a hinge such that it can be rotated about an essentially vertically running axis, wherein, for forming a frictional-latching functionality, the hinge has a shaft with a protrusion, in particular with a protuberance, and also has a bushing with a mount, in particular a depression, which is assigned to the protrusion, wherein the shaft is mounted in the bushing and the protrusion, in a latching-in position, engages in the mount.

In contrast to the prior art, the hinge of the headrest according to the invention comprises the mount, which is assigned to the protrusion, and is configured, for example, to complement the protrusion. The protrusion engages in said mount and thus fixes the wing element in an adjustment position, which can be assigned to the latching-in position, and prevents further pivoting. The frictional-latching functionality here advantageously ensures that a frictional force counteracts a transfer movement of the wing element between two adjustment positions. During the transfer movement, the hinge assumes a transition position, in which the protrusion is arranged outside the mount. In particular, provision is made here for the protrusion, during the transfer movement of the wing element between two adjustment positions, to be moved along an inner side of the bushing and to latch into the mount by engaging therein, as a result of which the frictional force which accompanies the transfer movement is essentially eliminated. The configuration of the hinge according to the invention, then, advantageously makes it possible to give a seat occupant a sensation of the wing element latching in, this sensation allowing the seat occupant to establish that the wing element has assumed an adjustment position. Moreover, the latched-in protrusion counteracts undesired pivoting of the wing element.

The wing element can preferably be transferred in a reversible manner between a swung-back adjustment position and a swung-forward adjustment position. Provision is also made for an inner side of the bushing to run essentially concentrically in relation to the axis of rotation and preferably for the mount to extend along the inner side of the bushing in part, or in its entirety, essentially parallel to the axis of rotation, i.e. in the radial direction. Provision is also made for the protrusion to extend along the shaft essentially parallel to the axis of rotation, preferably in its entirety over a region which is arranged within the bushing. For example, as seen in a section plane running perpendicularly to the axis of rotation, the protrusion has a semicircular edge progression or a convexity and, as seen in the same section plane, the bushing has a semicircular depression or niche, which serves as a mount. Two hinges are preferably provided for each wing element, and said hinges are arranged particularly preferably in alignment with one another. The hinges are preferably of essentially identical construction and quite particularly preferably are provided in a mirror-symmetrical manner in relation to one another.

Advantageous configurations and developments of the invention can be gathered from the dependent claims as well as from the description, with reference to the drawings.

According to a further embodiment of the present invention, provision is made for the shaft to be arranged on the basic element and for the bushing to be arranged on the wing element. In particular, provision is made for the bushing to be an integral constituent part of the wing element and/or for the shaft to be an integral constituent part of the basic element. Provision is made here in particular for the shaft to be configured in the form of a pin which, for mounting purposes, engages in the bushing.

According to a further embodiment of the present invention, provision is made for the bushing, in particular the inner side of the bushing, to be configured in an at least partially elastically deformable manner. During transfer of the wing element, the protrusion, in particular the protuberance, interacts with the inner side of the bushing. In particular, the bushing here, by virtue of its elastic deformability, acts on the shaft in the manner of a spring, of which the restoring force ensures that the wing element can be swung or pivoted, for example in the rearward direction, or that the wing element is fixed in an adjustment position, for example in the swung-forward adjustment position.

According to a further embodiment of the present invention, provision is made for the bushing to be deformed elastically by the protrusion in the transition position. In particular, the protrusion here pushes against the inner side of the bushing in the radial direction, i.e. in a direction running perpendicularly to the axis of rotation.

According to a further embodiment of the present invention, provision is made so that, alongside the mount, at least one further mount is provided for the protrusion. In particular, the protrusion, in a further latching-in position, which is assigned preferably to a further adjustment position of the wing element, engages in the further mount. The distance between the mount and the further mount here defines the angle by which the wing element can be pivoted between the adjustment position and the further adjustment position. In particular, it is conceivable for the region between the mount and the further mount to be elastically deformable. It is also conceivable for the region of the mount, i.e. the region of the depression in the bushing, likewise to be elastically deformable or for the inner side of the bushing as a whole to be elastically deformable.

According to a further embodiment of the present invention, provision is made for the further mount to differ from the mount in respect of size and/or shape. As a result, an amount of force applied for leaving the latching-in position differs from the amount of force applied for leaving the further latching-in position.

According to a further embodiment of the present invention, provision is made for the shaft to have a plurality of protrusions, preferably four protrusions. For example, the protrusions are arranged on opposite sides of the shaft. In particular, provision is made for the protrusions to be distributed uniformly along the circumference of the shaft. This makes it possible for the forces which act on the elastically deformable regions of the bushing during transfer of the wing element to be distributed uniformly.

According to a further embodiment of the present invention, provision is made for the bushing and the shaft to be of frustoconical configuration.

According to a further embodiment of the present invention, provision is made for an axial stop and/or a radial stop to be provided. In particular, the shaft has an axial stop, which prevents the shaft from automatically becoming detached from the recess. The headrest preferably has a radial stop, which prevents the wing elements from rotating outward by a certain extent. This stop may be important in particular in the event of an accident, in order to prevent the wing elements from moving too far away from the seat occupant's head. However, it is also possible for the stop to avoid the situation where a vehicle occupant is otherwise injured.

The wing elements can preferably be adjusted in a multiplicity of adjustment positions relative to the basic element. For example, the wing elements can also be moved into a stowage position, in which they are arranged parallel to the basic element, and in particular in abutment against the same.

According to a further embodiment of the present invention, provision is made for each wing element to have a carrying structure, which is provided in two parts. It is preferably the case that these two parts are connected to one another, preferably plugged together, when the wing element is being installed on the basic element. It is quite particularly preferably the case that the plugging-together operation takes place during or after the operation of introducing the shaft into the bushing of the basic element.

The headrest preferably has a securing means which secures the assembly of the two parts of the wing element once these have been plugged together.

The present invention also relates to a method for assembling a headrest according to the invention, wherein the wing element is moved along an essentially horizontally running direction until the shaft latches in the bushing. It is preferably the case that one of the end sides of the bushing strikes against the axial stop during the latching-in operation.

The method according to the invention has the advantage that the wing elements can be fastened very straightforwardly on the basic element.

Further details, features and advantages of the invention can be gathered from the drawings and also from the following description of preferred embodiments with reference to the drawings. The drawings here illustrate merely exemplary embodiments of the invention, which do not limit the concept of the invention.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 shows perspective views of—from right to left—a bushing, a shaft and a hinge, made up of the bushing and shaft, for a headrest according to the exemplary embodiment of the present invention; and FIG. 4 is a view showing the headrest according to the exemplary embodiment of the present invention without padding.

DESCRIPTION OF THE PREFERRED EMBODIMENTS

Figure 1:
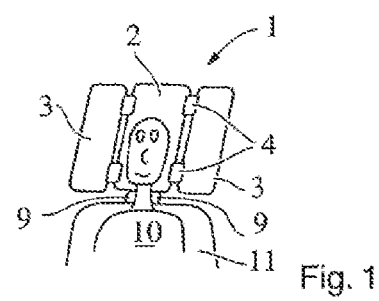
FIG. 1 is a schematic view showing a headrest according to an exemplary embodiment of the present invention.

Referring to the drawings, In the various figures, like parts are always provided with the same reference signs, and it is therefore usually also the case that they are each named or mentioned only once.

FIG. 1 illustrates a headrest 1 according to an exemplary embodiment of the present invention which is provided on the backrest 11 of a vehicle seat by means of retaining rods 9. The vehicle seat has an occupant 10 sitting in it. The headrest 1 comprises preferably a basic element 2, on which are provided the retaining rods 9, by means of which the basic element 2 is fastened on the backrest 11. In particular, the headrest 1 is height-adjustable and/or can have its inclination adjusted in the direction of, or away from, the head of the seat occupant 10. Provision is also preferably made here for the headrest 1 to have a wing element 3 in each case to the right and left of the basic element 2, wherein the wing element 3 is mounted on the basic element 2 in each case by means of two hinges 4. The two hinges 4 constitute a vertical axis 12, about which the wing element 3 is mounted in a rotatable manner. Each wing element 3 can be adjusted into a multiplicity of positions. It is quite particularly preferably the case that the wing element 3 can also be moved in a stowage position, in which it is arranged essentially parallel to the basic element 2 and in abutment against the same. In particular, provision is made for the wing element 3 to be transferrable in a reversible manner between a swung-forward adjustment position and in a swung-back adjustment position. For example, the swung-forward wing element then serves to protect the head of the seat occupant 10 against the sun or to provide him with a rest for the side of his head.

Figure 2:
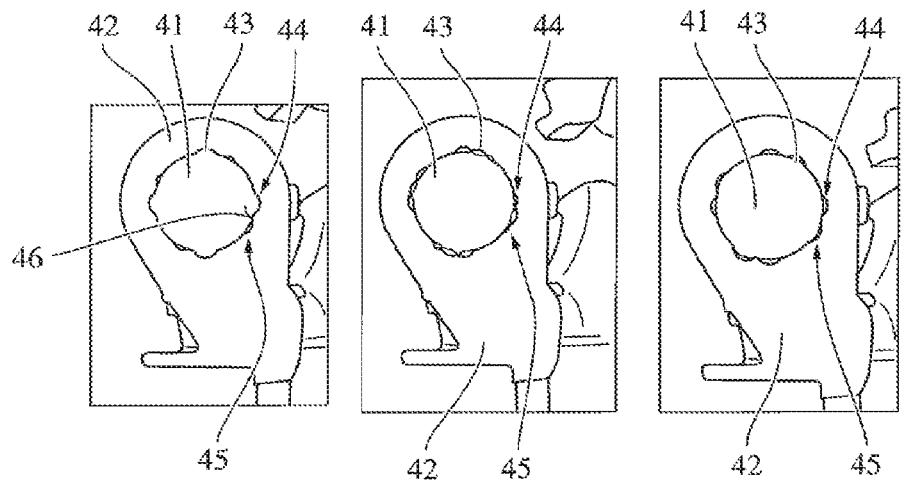
FIG. 2 shows sectional views of a hinge for a headrest according to the exemplary embodiment of the present invention.

FIG. 2 illustrates a sectional view of the hinge 4 of the headrest 1 according to the exemplary embodiment of the present invention in three different positions of the wing element 3. The plane selected for the sectional view here runs essentially horizontally through the hinge 4, i.e. perpendicularly to the axis. For forming a frictional-latching functionality, the hinge 4 comprises, on the basic element, a shaft 41 with at least one protrusion 43, in this case four protrusions 43, and also comprises a bushing 42 with in each case one mount 44, in particular depression, assigned to the protrusion and a further mount 45, in particular further depression, assigned to the protrusion. Provision is made here for the shaft 41 to be mounted in a pivotable manner in the bushing 42. Provision is also made for the protrusion 43—as shown in the left-hand part of FIG. 2—in one latching-in position, to engage in the mount 44 and—as shown in the right-hand part of FIG. 2—in a further latching-in position, to engage in the further mount 45. For reversible transfer between the latching-in position and the further latching-in position, provision is made for the protrusion 43, in a transfer position, to be moved with guidance along an inner side 46 of the bushing 42 between the mount 44 and the further mount 45, in particular in contact with the bushing. In particular, a region of the bushing 42 between the mount 44 and the further mount 45 is of elastically deformable configuration. In particular, —the shaft 41 with the protrusion 43 and—the bushing 42 with the mount 44 and the further mount 45 are configured such that the protrusion 43, in the transition position, pushes against the deformable inner side 46 of the bushing 42. In particular, the inner side 46 of the bushing 42 between the mount 44 and the further mount 45, in the transition position, is prestressed in relation to the protrusion 45, and therefore in relation to the shaft 41. This gives rise to a frictional force which counteracts a transition movement by way of which the wing element 3 is transferred in a reversible manner between the latching-in position and the further latching-in position. In particular, the configuration of the elastically deformable region and of a depth of the mount 44, and of a further depth of the further mount 45, establishes a sensation by which the seat occupant 10 registers the latching of the wing element 3 in the latching-in position or in the further latching-in position. Provision is also made for the depth of the mount 44 to differ from the further depth of the further mount 45. In particular, the further depth is smaller than the depth. For example, the ratio of the further depth to the depth is 0.6. This advantageously makes it possible to realize a latching-in intensity in the latching-in position which is greater than the latching-in intensity in the further latching-in position. Furthermore, the at least partially elastically deformable bushing 42 assumes the task of a spring, which ensures that the wing element 3 is pivoted in the rearward direction or is retained, or fixed, in the latching-in position or in the further latching-in position. Provision is also made for a plurality of protrusions 43, preferably four protrusions 43, each with an assigned mount 44 and further mount 45 to be provided, wherein the protrusions 43 and the mount 44 are distributed uniformly along the circumference of the shaft 41 and the inner side 46 of the bushing 42, respectively. Provision is also made for in each case two of said plurality of protrusions 43 on the shaft 41 and two of said plurality of mounts 44 to be located opposite one another. Provision is also made for the distances between the mount 44 and the further mount 45 along a circumferential direction running on the inner side 46 of the bushing 42 to be essentially equal for a number of the plurality of mounts 44.

FIG. 3 illustrates perspective views of the hinge 4 of the headrest according to the exemplary embodiment of the present invention, wherein the central part of FIG. 3 illustrates the basic-element-mounted shaft 41 on its own and the right-hand part of FIG. 3 illustrates the wing-element-mounted bushing 42 on its own, whereas the bushing 42 and shaft 41 have been joined together to form the hinge 4 in the left-hand part of FIG. 3. Provision is made here in particular for the bushing 42 to have apertures or free spaces at least in some areas outside the region between the mount 44 and the further mount 45. This advantageously reduces the amount of material used. In particular, the bushing 42 comprises crosspieces 47, which run parallel to the axis of rotation and in which are integrated in each case a mount 44, a further mount 45 and a deformable region between the mount 44 and the further mount 45. In particular, provision is made for the crosspieces 47 to project as far as an axial stop 48 of the shaft 41. Furthermore, it is conceivable, as seen in the axial direction, for approximately half of the bushing 42 to be completely closed and for the other half to comprise crosspieces 47.

FIG. 4 illustrates the headrest 1 according to the exemplary embodiment of the present invention without padding. It can be seen that the wing elements 3, which are arranged opposite one another on the basic element 2, are connected to the basic element 2 in each case via two hinges 4. The wing elements 3 here are configured preferably in a mirror-inverted manner in relation to one another and have structural parts via which, for example, padding can be fitted on the wing element 3.

While specific embodiments of the invention have been shown and described in detail to illustrate the application of the principles of the invention, it will be understood that the invention may be embodied otherwise without departing from such principles.

The invention claimed is:

1. A headrest for a vehicle, the headrest comprising:
   a basic element;
   a wing element;
   a hinge, the wing element being mounted on the basic element by means of the hinge such that the wing element can be rotated about an essentially vertically running axis with the hinge providing frictional-locking, wherein the hinge has a shaft with a protrusion and also has a bushing with a mount, which mount is assigned to the protrusion, the shaft is mounted in the bushing the protrusion, in a latching-in position, engages in the mount, wherein the bushing and the shaft are of frustoconical configuration.

2. The headrest as claimed in claim 1, wherein the protrusion has a protuberance and the mount has a depression, wherein the mount is configured to complement the protrusion.

3. The headrest as claimed in claim 1, wherein the hinge is designed such that a frictional force counteracts a transfer movement of the wing element between two latching-in positions, wherein, during the transfer movement, the hinge assumes a transition position, in which the protrusion is arranged outside the mount.

4. The headrest as claimed in claim 1, wherein the wing element can be transferred in a reversible manner between a swung-back adjustment position and a swung-forward adjustment position, wherein an inner side of the bushing runs essentially concentrically in relation to the axis of rotation, and wherein the mount extends along the inner side of the bushing in part, or in an entirety thereof, essentially parallel to the axis of rotation.

5. The headrest as claimed in claim 1, wherein the protrusion extends along the shaft essentially parallel to the axis of rotation, in an entirety over a region which is arranged within the bushing.

6. The headrest as claimed in claim 1, wherein the shaft is arranged on the basic element and the bushing is arranged on the wing element, wherein the bushing is an integral constituent part of the wing element and/or the shaft is an integral constituent part of the basic element.

7. The headrest as claimed in claim 1, wherein the bushing, in particular the inner side of the bushing, is configured in an at least partially elastically deformable manner, and wherein the hinge is designed such that the bushing is deformed elastically by the protrusion in the transition position.

8. The headrest as claimed in claim 1, wherein, alongside the mount, at least one further mount is provided for the protrusion, the shaft having another protrusion and the bushing having another mount, the mount having a mount depth, the another mount having another mount depth, the mount depth being less than the another mount depth, wherein a ratio of the mount depth to the another mount depth is 0.6.

9. The headrest as claimed in claim 8, wherein the further mount differs from the mount in respect of size and/or shape.

10. The headrest as claimed in claim 1, wherein the shaft has a plurality of protrusions and the bushing comprises a plurality of mounts, wherein a depth of one of the plurality of mounts is less than a depth of another one of the mounts.

11. The headrest as claimed in claim 1, wherein an axial stop and/or a radial stop are/is provided.

12. The headrest as claimed in claim 1, wherein the wing element can be adjusted in a multiplicity of adjustment positions relative to the basic element.

13. The headrest as claimed in claim 1, wherein the wing element has a carrying structure, which is provided in two parts.

14. A method for assembling a headrest, the method comprising:
   a basic element;
   a wing element;
   a hinge;
   mounting the wing element on the basic element by means of the hinge such that the wing element can be rotated about an essentially vertically running axis with the hinge providing frictional-locking, wherein the hinge comprises a shaft with a protrusion, a bushing with a mount, which mount is assigned to the protrusion, the bushing and the shaft being of frustoconical configuration, wherein the shaft is mounted in the bushing and the protrusion, in a latching-in position, engages in the mount, wherein the wing element is moved along an essentially horizontally running direction until the shaft latches in the bushing.

15. A method as claimed in claim 14, wherein the protrusion has a protuberance and the mount has a depression, wherein the mount is configured to complement the protrusion, the shaft having another protrusion and the bushing having another mount, the another mount having another depression, the another depression having another depression depth, the depression having a depression depth, the another depression depth being less than the depression depth, wherein a ratio of the another depression depth to the depression depth is 0.6.

16. A method as claimed in claim 14, wherein the hinge is designed such that a frictional force counteracts a transfer movement of the wing element between two latching-in positions, wherein, during the transfer movement, the hinge assumes a transition position, in which the protrusion is arranged outside the mount.

17. A method as claimed in claim 14, wherein the wing element can be transferred in a reversible manner between a swung-back adjustment position and a swung-forward adjustment position, wherein an inner side of the bushing runs essentially concentrically in relation to the axis of rotation, and wherein the mount extends along the inner side of the bushing in part, or in an entirety thereof, essentially parallel to the axis of rotation.

18. A method as claimed in claim 14, wherein the protrusion extends along the shaft essentially parallel to the axis of rotation, in an entirety over a region which is arranged within the bushing.

19. A method as claimed in claim 14, wherein the shaft is arranged on the basic element and the bushing is arranged on the wing element, wherein the bushing is an integral constituent part of the wing element and/or the shaft is an integral constituent part of the basic element.

20. A method as claimed in claim 14, wherein the shaft has another protrusion and the bushing has another mount, wherein the another mount has a depth that is greater than a depth of the mount.

* * * * *